United States Patent
Kato et al.

(10) Patent No.: US 8,494,806 B2
(45) Date of Patent: Jul. 23, 2013

(54) METHOD, PROGRAM AND APPARATUS FOR OPTIMIZING CONFIGURATION PARAMETER SET OF SYSTEM

(75) Inventors: Sei Kato, Kawasaki (JP); Takayuki Osogami, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/306,702

(22) PCT Filed: Jun. 21, 2007

(86) PCT No.: PCT/JP2007/062531
§ 371 (c)(1),
(2), (4) Date: Jun. 28, 2010

(87) PCT Pub. No.: WO2008/001678
PCT Pub. Date: Jan. 3, 2008

(65) Prior Publication Data
US 2010/0268511 A1    Oct. 21, 2010

(30) Foreign Application Priority Data

Jun. 26, 2006 (JP) ................................. 2006-175489

(51) Int. Cl.
*G06F 17/18* (2006.01)
*G06F 11/00* (2006.01)

(52) U.S. Cl.
USPC ............ 702/179; 702/182; 702/183; 702/188

(58) Field of Classification Search
USPC .................. 702/121–123, 182–189
See application file for complete search history.

(56) References Cited

U.S. PATENT DOCUMENTS
2005/0044197 A1* 2/2005 Lai ................................. 709/223
2005/0251801 A1 11/2005 Takano FOREIGN PATENT DOCUMENTS
JP    2003-131907    *    5/2003
JP    2003131907          5/2003
JP    2004046734          2/2004

OTHER PUBLICATIONS

Law, et al, "Simulation Modeling and Analysis—Third Edition", "Experimental Design, Sensitivity, Analysis, and Optimization", pp. 622-646, (2000).
Xi, et al, "A Smart Hill-Climbing Algorithm for Application Server Configuration", WWW2004, pp. 287-296, May 17, 2004.

* cited by examiner

*Primary Examiner* — Phoung Huynh
(74) *Attorney, Agent, or Firm* — William Stock; Anne Vachon Dougherty

(57) ABSTRACT

The method includes the steps of: storing a plurality of parameter sets; selecting one of the plurality of parameter sets as a test parameter set to be evaluated; measuring performance only for one batch job out of N (N is a positive integer) batch jobs constituting full set performance measurement for the test parameter set; and calculating an evaluation value on the basis of a difference between an integral of measurement values obtained until the performance has been measured for r (r is a positive integer smaller than N) batch jobs by using the test parameter set; and an integral of mean measurement values of the performance for the r batch jobs by using an optimal parameter set which is one of the parameter sets used in the performance evaluation having been performed; determining whether or not the evaluation value has deviated from a predetermined evaluation continuing range; and terminating the evaluation of the test parameter set on condition that it is determined that the evaluation value has deviated form the evaluation continuing range toward performance deterioration. It is preferable that the predetermined evaluation continuing range be of a width from a width W where r is equal to zero, to a width W' ($0 \leq W' < W$) where r is equal to N. Furthermore, it is preferable that W' be zero.

28 Claims, 7 Drawing Sheets

METHOD, PROGRAM AND APPARATUS FOR OPTIMIZING CONFIGURATION PARAMETER SET OF SYSTEM

BACKGROUND OF THE INVENTION

The present invention generally relates to a system optimization technique, and more particularly, relates to a method, a program and an apparatus for optimizing a configuration parameter set of a system.

With the proliferation of the Internet, a Web system is in wide use in recent years. A typical Web system includes: an HTTP server which is a gateway; an application server; and a database server. The system is connected to a client via the Internet. The HTTP server receives an HTTP request transmitted from the browser of a client via the Internet, and passes the request to the application server after filtering is performed on the request. The application server appropriately uses data obtained by transmitting a query to the database server. Furthermore, by executing application software, the application server processes the request received from the HTTP server.

The performance of a web system (for example, a throughput which is the capability of processing requests per unit time) depends on a plurality of various configuration parameters (simply referred to as "parameters" in this specification) such as: the maximum allowable number of client connections to the HTTP server; the initial heap size, the maximum heap size, the maximum thread size, and the maximum pool size of the application server; the buffer pool size, and presence or absence of an index of the database server. It is apparent that the optimization of a parameter set is needed in order to maximize the performance of a web system.

As a method for optimizing the parameter set of a web system, considered is a method in which throughputs are measured with respect to each of a plurality of prepared parameter sets, by applying a workload to the web system for a fixed period of time. Then, a parameter set of which throughput is the maximum is selected. However, this method may take an enormous amount of time required for optimization since even a simple web system has approximately 300 possible parameter sets. Additionally, the performance may not be measured accurately since a fixed period of time for applying a workload to a system under each parameter set is too short, or the performance may be measured more than necessary since the fixed period of time is too long.

Furthermore, in order to solve the problem that optimization requires too long a time, there is one possible method in which parameter sets are selected out of the plurality of prepared parameter sets in the order of parameter sets that a system designer considers to be optimal on the basis of the experience and intuition, and in which the best configuration is then adopted out of the selected parameter sets. However, this method is based on subjectivity, and lacks versatility. In order to solve the problem of subjectivity, a technique for optimizing a parameter set and for evaluating performance of a web system is disclosed in the following documents.

A. M. Law and W. D. Kelton, Simulation Modeling and Analysis ($3^{rd}$ edition), McGraw-Hill (2000) discloses a method for selecting a configuration having the best measurement value by using the design of experiment. In this method, the performance is not measured in cases of all of the configurations, but the performance is measured with a certain degree of accuracy in a case of a part of the configurations that is selected randomly without using information obtained by a measurement.

Japanese Patent Application Laid-open No. 2005-222343 discloses a search algorithm using the downhill simplex method. In this disclosed method, the performance is measured with a certain degree of accuracy in a case of a configuration close to an existing optimal configuration. Then, the search algorism causes the optimal configuration to be replaced with the thus measured configuration if the measurement result thereof is better than the existing optimal configuration.

B. Xi, Z. Liu, M. Raghavachari, C. H. Xia, and L. Zhang, "A smart hill-climbing algorithm for application server configuration," in Proceedings of the $13^{th}$ International Conference on World Wide Web, pages 287-296 (2004) discloses a search algorithm for replacing one of configurations is considered to be an optimal configuration with another configuration. In this method, one of the configurations under which the performance has not been measured is estimated to be superior to the others by regressing an already-obtained measurement value to a quadratic function. Then, under the estimated configuration, the performance is measured with a certain degree of accuracy. If the measurement result is better than that under the optimal configuration, the optimal configuration is replaced with the estimated configuration.

Japanese Patent Application Laid-open No. 2003-131907 discloses a technique for: virtually substantiating a plurality of clients connected to a web system including bottleneck which is targeted for performance evaluation; adding a workload to a computer for performance measurement; and outputting the evaluation result including information on the performance of a web system and information on bottleneck avoidance.

Japanese Patent Application Laid-open No. 2004-46734 discloses a technique for: previously storing a model pattern, a system characteristic, a functional characteristic, and a response-time prediction model information in a system model database; and causing a performance prediction program to predict the performance of a web system in accordance with parameters inputted as input items and information in the system model database.

According to the above prior arts, an optimal configuration may not be included in a selected parameter set group which is targeted for evaluation, or performance measurement may be performed more than necessary on some parameter sets since all parameter sets targeted for evaluation are subjected to performance measurement with a fixed degree of accuracy.

SUMMARY OF THE INVENTION

Against this background, one of objects of the present invention is to provide a method, a program, and an apparatus for optimizing the parameter set of a system by more effectively selecting a parameter set which maximizes the performance of the system.

In order to achieve the above object, provided is a method for optimizing a parameter set for a system composed of a plurality of configuration parameters. The method includes the steps of: storing a plurality of parameter sets; selecting one of the plurality of parameter sets as a test parameter set to be evaluated; measuring a performance only for one batch job out of N (N is a positive integer) batch jobs of which full set performance measurement of the test parameter set is composed; calculating an evaluation value on the basis of a difference between an integral of measurement values obtained until the performance has been measured for r (r is a positive integer smaller than N) batches in the test parameter set; and an integral of mean measurement values of the performance for the r batches in an optimal parameter set being one of the parameter sets for which performance evaluation has been performed. Here, r is the number of batches on which performance measurement of the test parameter set has already been performed; determining whether or not the evaluation value has deviated from an evaluation continuing range; and terminating the evaluation for the test parameter set on condition that the evaluation value is determined, in the determining step, to have deviated from the evaluation continuing range in a direction of performance deterioration. It is preferable that the width of the predetermined range of the evaluation continuing range be of a width from a width W where r is equal to zero, to a width W' ($0 \leqq W' < W$) where r is equal to N.

It is preferable that the method replaces the current optimal parameter set with the relevant test parameter set, and carries out the performance measurement for the full set of relevant test parameter set on condition that the evaluation value is determined to have deviated from the evaluation continuing range in a direction of performance improvement. It is preferable that the method repeat the above steps until the evaluation value is determined to have deviated from the evaluation continuing range in the direction of performance deterioration or of performance improvement.

The selecting step selected can select, as a test parameter set, a parameter set estimated to achieve the best performance out of the plurality of parameter sets. In this case, it is preferable that the step: calculate a performance curve by regressing a squared error to which a weight is assigned in relation to the accuracy of the evaluation result so as to minimize the squared error, by use of the evaluation result of a parameter set of which performance has already been evaluated; and search for the parameter set under which the performance is estimated to be the best, by use of the performance curve.

As for the above-mentioned squared error to which a weight is assigned in relation to the accuracy of the evaluation results, it is preferable that a weight be assigned to this squared error on the basis of an index showing variations in the number of batches of the performance evaluation which is performed for each parameter set, and/or in the performance evaluation value of each parameter set.

Hereinabove, descriptions have been given of a summary of the present invention as the method for optimizing a parameter set. Meanwhile, the present invention can be grasped as an apparatus, a program, or a program product for optimizing a parameter set. The program product can include, for example, a recording medium in which the above-mentioned program is stored, or a medium which transmits the program.

It should be noted that the summary of the above-mentioned invention does not list all of the necessary features of the present invention, and that a combination or a subcombination of these structural elements can also be considered as the invention.

BRIEF DESCRIPTION OF THE DRAWINGS

For a more complete understanding of the present invention and the advantage thereof, reference is now made to the following description taken in conjunction with the accompanying drawings, in which.

DETAILED DESCRIPTION OF THE PREFERRED EMBODIMENT

Figure 1:
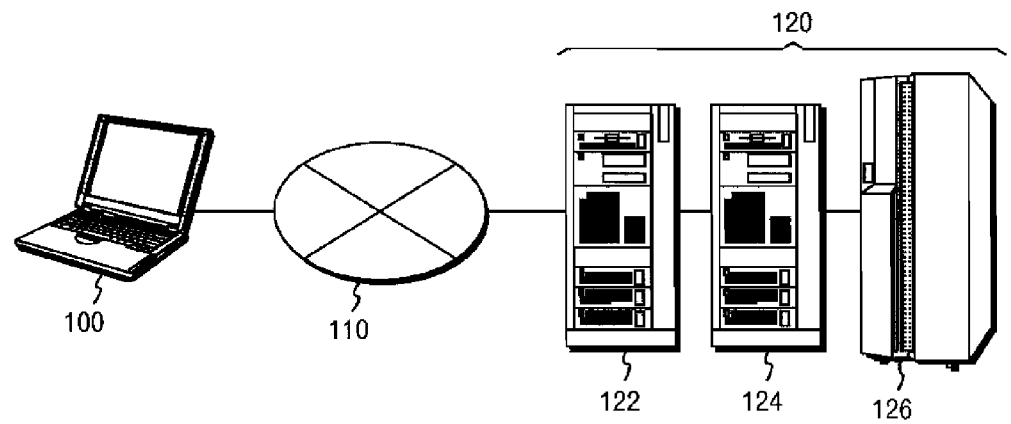
FIG. 1 is a view showing a parameter set optimization apparatus and a web system connected to the optimization apparatus in an embodiment of the present invention.

Hereinafter, detailed descriptions will be given of the best mode for carrying out the present invention on the basis of the drawings. The following embodiment does not limit the invention recited in the scope of claims, and all of combinations of features described in the embodiment are not necessarily essential to means for solving the problems.

Furthermore, the present invention can be carried out in a number of different aspects, and should not be understood as being limited to the descriptions of the embodiment thereof. Moreover, it should be noted that all of the combinations of features described in the embodiment are not necessarily essential to means for solving the problems. The same reference numerals are assigned to the same elements through the entire descriptions of the embodiment.

FIG. 1 shows an example of the external appearances of a parameter set optimization apparatus 100 (hereinafter, simply referred to as the "optimization apparatus 100"), and a web system 120 which should be optimized, according to the embodiment of the present invention. In the embodiment of the present invention, the optimization apparatus 100 and the web system 120 are connected to each other via a network 110.

The optimization apparatus 100 stores a plurality of configuration parameter sets prepared for the web system 120 which should be optimized. The optimization apparatus 100 sets a configuration of the web system by use of each parameter set, and carries out performance evaluation by applying a weight to the web system 120. The optimization apparatus 100 then selects an optimal parameter set which optimizes the performance of the web system 120, on the basis of the result of the performance evaluation.

The network 110 is a communication path which connects the optimization apparatus 100 to the web system 120. For example, the network 110 can be substantiated with the Internet. The network 110, which is the Internet, connects between systems by use of a well-known TCP/IP (a Transmission Control Protocol/an Internet Protocol). In the network 110, systems which communicate with each other are specified by IP addresses indicated in a global address or in a local address.

The web system 120 has a function of offering an application service in accordance with a request (preferably, an HTTP request) from a client. In the embodiment of the present invention, the web system 120 adopts what is termed as a three-layer structure, and includes an HTTP server 122, an application server 124 and a database server 126.

HTTP server 122 has a function of receiving the request from the client, then performing filtering on the request, and thereafter passing the resultant request to the application server 124. Those skilled in the art can appropriately construct the HTTP server 122 by use of Apache, which is open source software of Apache Software Foundation, and an internet information service (ITS) of Microsoft Corporation.

The application server 124 has functions of executing application software which is previously introduced, in response to the request from the client, and of returning a result thereof. The application server 124 has a function of generating a query (preferably, an SQL query) which inquires about data necessary for executing the application, as well as a function of inquiring of the database server 124. Those skilled in the art can appropriately construct the application server 124 by use of a WebSphere® product offered by International Business Machines Corporation and a Weblogic® product offered by BEA Systems Inc.

Database management software (DBMS) is installed in the database server 126, and manages database in which data necessary for causing the application server 124 to execute processing is stored. Those skilled in the art can appropriately construct the database server 126 by use of database management software (DBMS) such as a DB2® product offered by International Business Machines Corporation, an Oracle Database product offered by Oracle Corporation, and an SQL Server product offered by Microsoft Corporation.

Figure 2:
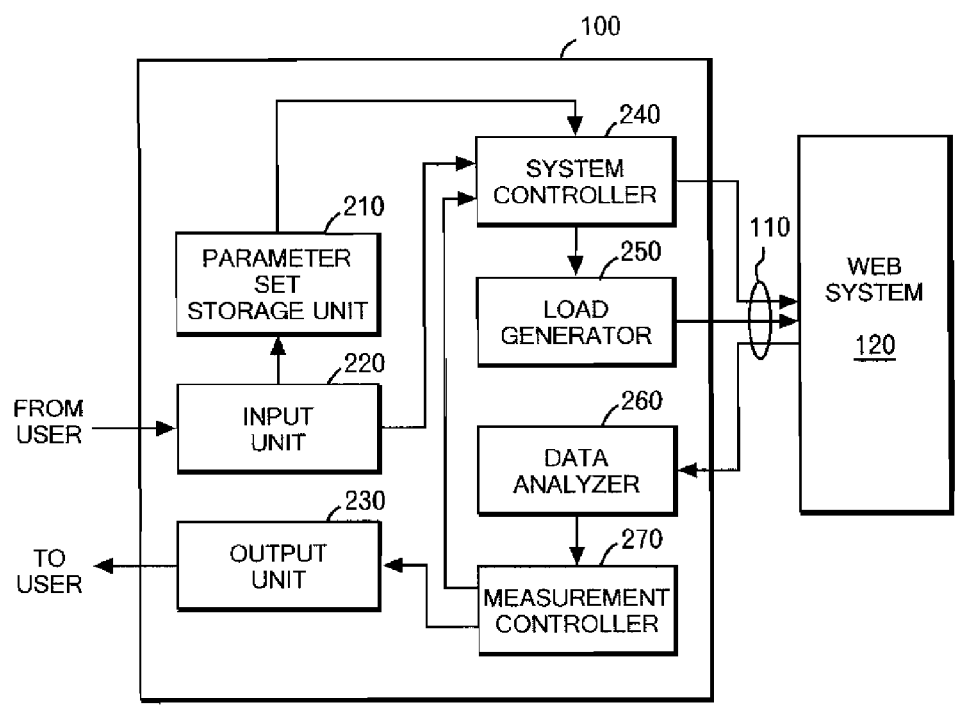
FIG. 2 is a functional block diagram of the optimization apparatus in the embodiment of the present invention.

FIG. 2 is a functional block diagram of the optimization apparatus 100 of the embodiment of the present invention. In an information processor having a hardware configuration described later by using FIG. 8, each element shown in the functional block diagram of FIG. 2 can be substantiated by: causing a CPU 1 to read an operating system and a computer program which are stored in a hard disk device 13 and the like, after the operating system and the computer program are loaded on a main memory 4; and causing a hardware resource to cooperate with software.

In the embodiment of the present invention, the optimization apparatus 100 includes a parameter set storage unit 210, an input unit 220, an output unit 230, a system controller 240, a workload generator 250, a data analyzer 260, and a measurement controller 270. The optimization apparatus 100 is connected to the target system 120 via the network 110.

The parameter set storage unit 210 stores parameter sets of the web system 120. It is preferable that a plurality of parameter sets be stored in the parameter set storage unit 210. Additionally, it is preferable that the parameter sets be stored in an eXtensible Markup Language (XML) format. Note that the parameter sets stored in the parameter set storing unit 210 may be prepared by a user, or may be automatically generated by a computer in accordance with a predetermined rule. Moreover, the parameter sets automatically generated by the computer may be selected by a user as appropriate, and then the selected parameter sets may be stored. In other words, it should be noted that a user can prepare the plurality of parameter sets in any manner.

The input unit 220 is substantiated with input devices such as a keyboard 6 and a mouse 7. The input unit 220 accepts, from a user who operates the optimization apparatus 100, inputs such as those of an operation on the setting of an initial parameter set and those of information on data and system control. The output unit 230 is substantiated by an output device such as a display device 11. The output unit 230 displays, for the user, information necessary for optimizing a parameter set, an error message, an optimal parameter set selected in accordance with the optimization processing of the embodiment of the present invention, and the like.

The system controller 240 holds the information on system control which is inputted by the user in the input unit 220. The system controller 240 sets the web system 120 on the basis of the user input from the input unit 220 and of an instruction from the measurement controller 270, by use of parameter sets for which performance should be measured, the parameter sets being obtained from the parameter set storage unit 210. In the embodiment of the present invention, the system controller 240 performs control such as the activation/stop of the workload generator 250, activation/stop of a program of the web system 120, and the initiation/termination of performance measurement.

The workload generator 250 generates, as a system workload for performance evaluation, a number of HTTP requests for each parameter set in accordance with an instruction from the system controller 240. Thereafter, the workload generator 250 sequentially transmits the HTTP requests to the web system 120. The workload generator 250 can generate a workload of an amount necessary for sufficiently evaluating the performance for each parameter set (hereinafter, referred to as the "workload of a full set"). The workload generator 250 can also generate a workload in a measurement unit into each of which the workload of a full set is divided (hereinafter, referred to as a "batch").

In the embodiment of the present invention, descriptions will be given of a case where it is supposed that the workload of a full set is applied by transmitting, for 30 minutes, each of the HTTP requests to the web system 120 formed of a corresponding parameter set. Meanwhile, the amount of the workload of the full set needs not be identical to one another for all of the parameter sets. Specifically, in order to obtain a measurement result in accordance with each parameter set, a greater workload may be applied when variations in the results of the performance measurement is large, and a smaller workload may be applied when the variations are small. In this manner, the amount of the workload of the full set may be different in each of the parameter sets.

Furthermore, in the embodiment of the present invention, descriptions will be given of a case where it is supposed that the workload of one batch is applied by transmitted the requests for 5 minutes (the workload in this event is equivalent to one-sixth of the requests transmitted for 30 minutes, which is the workload of the full set). However, in the event of determining the size of a batch, it is also possible to make the sizes of the respective batches in one parameter set different from one another, instead of dividing the batches into those in the identical size. In addition, it is also possible to uniformly change the size of a batch for each parameter set.

The data analyzer 260 obtains, via the network 110, the result of performance measurement of a response to the HTTP request transmitted from the workload generator 250 from the web system 120 for each parameter set to be evaluated, and then stores the result. The data analyzer 260 analyzes the obtained measurement result, and passes the analysis result including a mean value for each batch, to the measurement controller 270 when necessary.

The measurement controller 270 controls the performance measurement for each parameter set by causing the data analyzer 260 to monitor the response of the web system 120 to the HTTP request transmitted by the workload generator 250. In addition, the measurement controller 270 determines a parameter set for which performance is to be subsequently measured, and the termination of the measurement, by calculating a sample mean, sample variance, a determination standard, the total number of measurement units, on the basis of the mean for each measurement unit obtained from the data analyzer 260. Then, the measurement controller 270 transmits the determination result to the system controller 240. The measurement controller 270 transmits, to the output unit 230, information on a parameter set which has finally been determined to be optimal, in order to present the information to the user.

Figure 3:
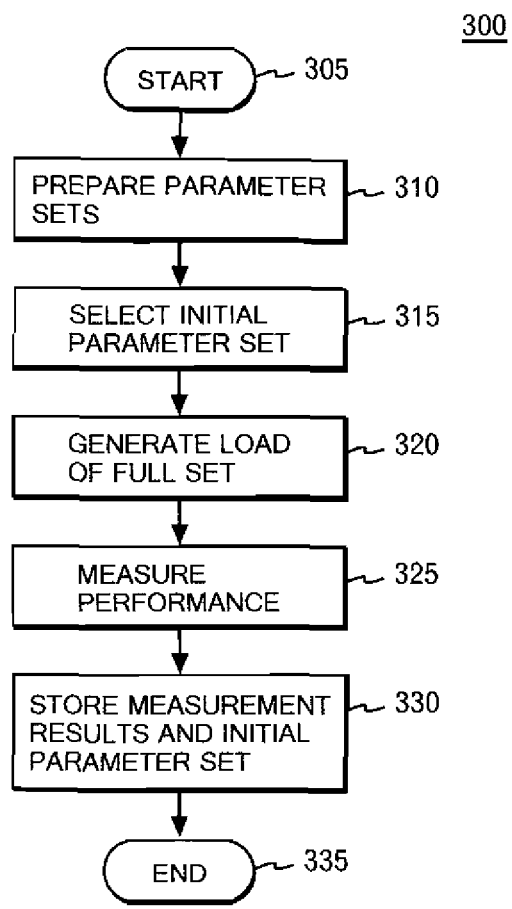
FIG. 3 is a flowchart expressing the initialization operations of the system in the embodiment of the present invention.

FIG. 3 is a flowchart 300 which expresses the initialization operations of the optimization apparatus 100 in the embodiment of the present invention. The processing starts in Step 305. In Step 310, a plurality of parameter sets are prepared, and are stored in the parameter set storage unit 210. As already described, the parameter sets to be prepared may be prepared by a user, or may be automatically generated by a computer in accordance with a predetermined rule. Furthermore, the parameter sets may be selected by a user as appropriate from the parameter sets automatically generated by the computer. In other words, it should be noted that the user can prepare the plurality of parameter sets in any manner.

The processing proceeds to Step 315, and the initial parameter set, for which performance is to be first evaluated, is selected from the plurality of parameter sets stored in the parameter set storage unit 210, in accordance with the input by the user from the input unit 220. In the embodiment of the present invention, it is possible to optimize a parameter set effectively by setting an initial parameter set with a configuration of which performance is as good as possible. Accordingly, it is preferable that the user selects, on the basis of experience and knowledge, an initial parameter set under which performance is considered to be as good as possible. For example, the user selects the initial parameter set by using knowledge that, as for the application server 124, "a quarter of a physical memory" is recommended for the maximum heap size, "a half of the maximum heap size" for the initial heap size, "50" for the maximum and the minimum thread sizes, "30" for the maximum and minimum connection pool sizes.

The processing proceeds to Step 320. Then, the measurement controller 270 automatically determines the content of an appropriate workload, and generates the workload of the full set (namely, the HTTP requests to be transmitted for 30 minutes). Incidentally, since the performance of a web system changes depending on a workload, it is necessary to apply the same appropriate workload in the performance measurement for each parameter set in order to compare different configuration parameters, and thereby to evaluate the performance of the web system 120. When the workload on the web system 120 is small, a workload of an appropriate amount needs to be given since a difference in performance due to a difference in the configuration parameter sets dose not appear clearly. Taking this property into consideration, the measurement controller 270 determines an appropriate workload level, and then generates a workload as follows in the embodiment of the present invention.

Specifically, the measurement controller 270 applies a workload with a small number of clients (for example, the number may be 2 to 3) to the web system 120 having the initial configuration parameter set. The measurement controller 270 then obtains the resource use rate of each resource which constitutes the web system 120. Thereafter, a throughput in a saturation state and the number of clients in a saturation state are obtained, by increasing a workload from the mean value of the obtained resource use rate. The measurement controller 270 determines twice the number of clients in the saturation state as the appropriate workload. In the embodiment of the present invention, the number of clients determined here is used to carry out the performance measurement for the configuration parameter sets in the later steps.

The processing proceeds to Step 325, and the performance of the system is measured with the initial parameter set by applying the workload generated in Step 320 to the web system 120 in which the initial parameter set is set by the system controller 240. At this time, the workload of the full set is applied (in other words, the HTTP requests are transmitted for 30 minutes), and the results of the performance measurement are monitored. After initiating the measurement, the statistical amount of each index of data on the results of the performance measurement is calculated. Then, it is determined whether or not the amounts fall within a fixed range. In this manner, it is determined whether or not a performance value has reached a statistically steady state. When it is determined that the performance value has not reached the statistically steady state before the time of terminating the measurement, the measurement of the parameter set is determined to be in a statistically unsteady state, and then an error message which informs the user of a failure in the measurement is preferably displayed on the output unit 230 via the measurement controller 270.

When it is determined that the performance value has reached the statistically steady state before the time of terminating the measurement and the performance measurement of the full set is terminated normally, the initial parameter set and the performance measurement result thereof are stored in Step 330. In this manner, the processing is terminated in Step 335.

Figure 4:
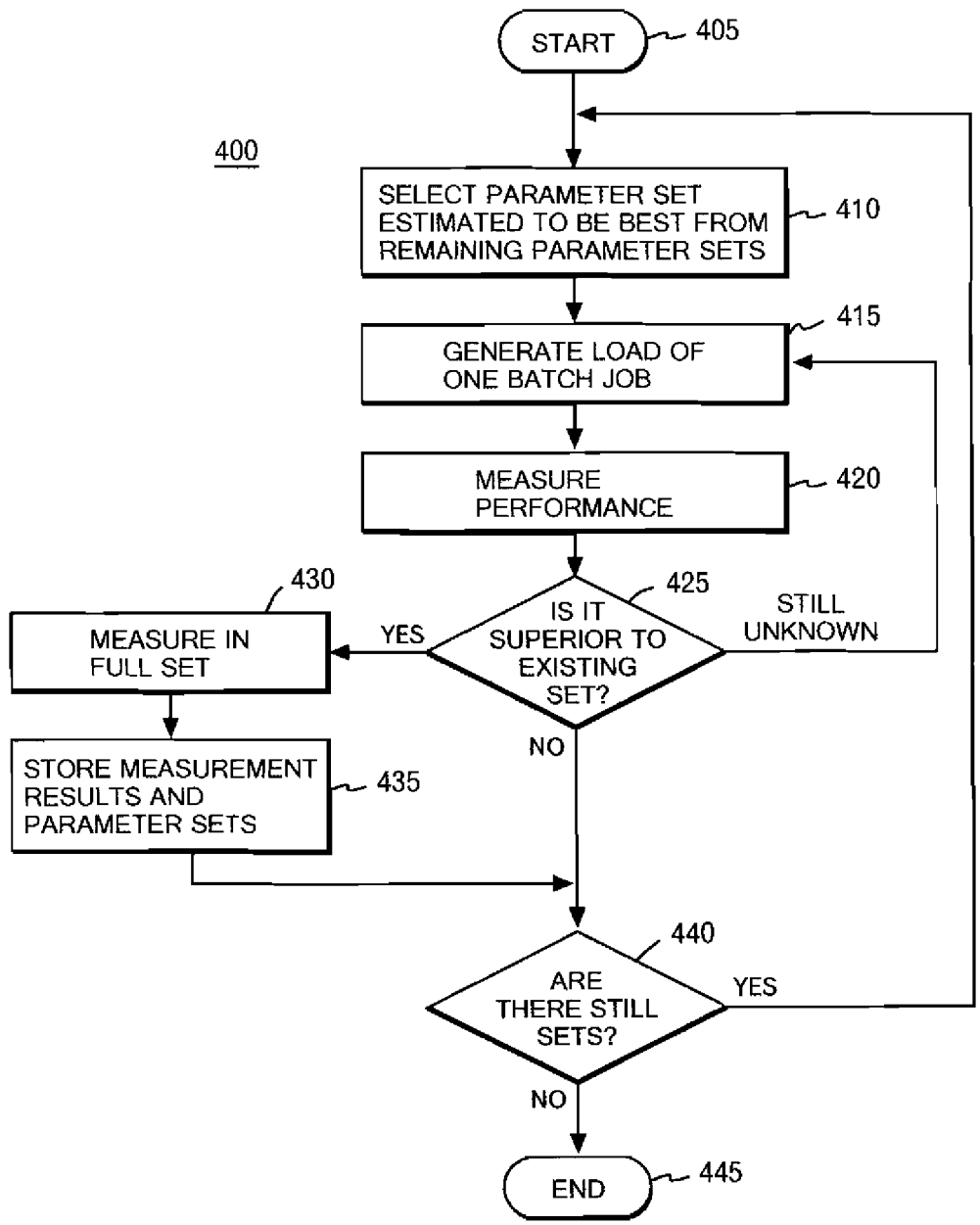
FIG. 4 is a flowchart expressing the operations of the system in the embodiment of the present invention.

FIG. 4 is a flowchart 400 expressing a flow of the optimization process for a configuration parameter set which is substantiated by the optimization apparatus 100 in the embodiment of the present invention. The processing starts in Step 405. In Step 410, a parameter set, under which performance is estimated to be the best, is selected from parameter sets for which performance has not been evaluated, and then parameter setting is performed on the web system 120. Incidentally, in the embodiment of the present invention, a parameter set which was selected to be evaluated in Step 410 is referred to as a "test parameter set." Detailed descriptions will be given later of the selection of the test parameter set in Step 410 with reference to FIG. 6.

The processing proceeds to Step 415, and a workload in a batch unit is generated. When a batch size is selected in a manner that a mean value of a performance measurement value in each batch is caused to be independently close to a normal distribution, superiority or inferiority of each of the parameter sets can be determined with a high degree of accuracy. As has been described above, in the embodiment of the present invention, the size of one batch is equivalent to the requests transmitted for five minutes. The processing proceeds to Step 420, and a workload of one batch job alone is given to the web system 120. Afterwards, the performance measurement is carried out.

The processing proceeds to Step 425, and it is determined which of the test parameter set and the parameter set achieving the best performance among the parameter sets for which performance has already been measured (referred to as an "optimal parameter set" in this specification) is superior to another, on the basis of the performance measurement results obtained in Step 420. Hereinafter, descriptions will be given of the method of this determination with reference to FIG. 5.

Figure 5:
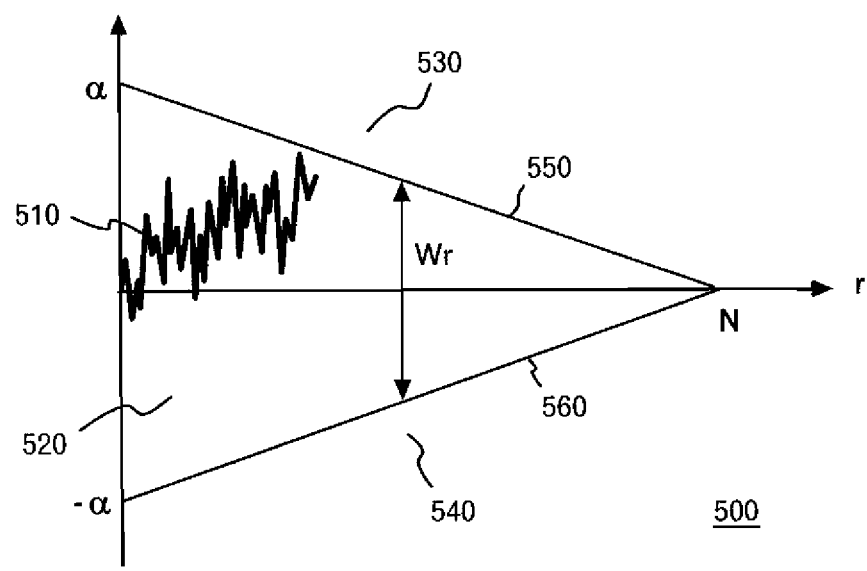
FIG. 5 is a graph expressing the progress of the performance evaluation of the system in the embodiment of the present invention.

FIG. 5 is a graph 500 expressing the progress of the performance evaluation of the system in the embodiment of the present invention. The horizontal axis of the graph 500 expresses a time axis of the progress of the performance evaluation for a certain configuration parameter set. The longitudinal axis of the graph 500 expresses an evaluation value which shows superiority or inferiority of the performance under the test parameter set and that under the performance under the optimal parameter set, the performance being grasped at a certain point of the progress of the performance evaluation. Specifically, the evaluation value used in the embodiment of the present invention is calculated on the basis of a difference between: an integral of measurement values obtained until the performance has been measured for r (r is a positive integer less than N) batches by using the test parameter set; and an integral of mean measurement values of the performance for the r batches by using the optimal parameter set being one of the parameter sets of which performance measurement has been performed. r is defined as the number of batch jobs for the test parameter set, for which the performance measurement has been completed (Incidentally, r is a positive integer smaller than N). In the embodiment of the present invention, the integral of the mean measurement values of the performance for the r batches by using the optimal parameter set can be found by multiplying the mean measurement value of the optimal parameter set by r.

The graph 500 of the embodiment of the present invention includes a first region 521, a second region 530 and a third region 540. The first region 520 is parted by two lines, which are straight lines 550 and 540. The straight line 550 indicates that the values thereon decrease linearly with an α intercept. The straight line 560 indicates that the values thereon increase linearly with a −α intercept. A line graph 510 of the above-mentioned evaluation values is plotted in the graph 500. Suppose that, in the embodiment of the present invention, a value indicated by the line graph 510 is in the first region 520 (that is, in the evaluation continuing range) because of a relatively small absolute value of a difference between: a value obtained by multiplying r by a mean value of the measurement results for the optimal parameter set grasped at the point of terminating the performance evaluation of r batch jobs; and an integral value for the measurement results of r batch jobs for the test parameter set. Which of the test parameter set and the optimal parameter set is superior to another is determined to be unknown.

Suppose that, in the embodiment of the present invention, the value of the line graph 510 falls within the second region 530 since the value obtained by multiplying r by the mean value of the measurement results of the optimal parameter set is considerably smaller than the integral value of the measurement results of r batch jobs for the test parameter set. In this case, it is determined that the test parameter set is superior to the optimal parameter set. On the other hand, suppose that the line graph 510 falls within the third region 540 since the value found by multiplying r by the mean value of the measurement results for the optimal parameter set is much greater than the integral value of the measurement results for r batch jobs for the test parameter set. In this case, it is determined that the optimal parameter set is superior to the test parameter set.

A noteworthy point in the above descriptions is that the width W of the evaluation continuing range is equal to 2α when r is equal to zero, and that the value thereof decreases to be the width W' of the evaluation continuing range, being equal to zero when r is equal to N. In other words, measurement accuracy is low immediately after the evaluation of the parameter set is initiated. In this event, suppose that a considerably large value is not obtained for the absolute value of the difference between: the value obtained by multiplying r by the mean value of the measurement results for the optimal parameter set; and the integral value of the measurement results for r batch jobs for the test parameter set. In this case, it is not possible to determine which of the optimal parameter set and the test parameter set is superior to another. In contrast, as the evaluation of the parameter set proceeds, the measurement accuracy for the test parameter set improves. Thus, even if the absolute value of the difference is small, it is possible to determine which of the optimal parameter set and the test parameter set is superior to another.

In the above descriptions, a case where the width of the evaluation continuing range decreases linearly has been considered. Meanwhile, various variations can be considered for alteration in the width of the evaluation continuing range. In other words, it should be noted that, as long as the width of the evaluation continuing range is greater than zero at least when r is less than N, it is possible to operate the optimization apparatus 100 of the embodiment of the present invention. In the embodiment of the present invention, it is preferable that W' be smaller than W. Incidentally, when W' is greater than zero and the line graph 510 is in the evaluation continuing range when r is equal to N, the optimization apparatus 100 preferably displays, on the output unit 230, an error message indicating that which of the test parameter set and the optimal parameter set is superior to another is finally unknown, and thereby informs a user of the message.

In accordance with the above method, when which of the test parameter set and the optimal parameter set is superior to another is determined to be unknown in Step 425, the processing returns from Step 425 to Step 415, and further repeats Steps 415 and 420. In other words, Steps 415 and 420 are repeated until the line graph 510 deviates from the evaluation continuing range in the direction of performance deterioration or of performance improvement. Here, in the embodiment of the present invention, at each time when Steps 415 and 420 are repeated, the width of the evaluation continuing range is made narrower, and then finally becomes zero. Hence, it should be noted that the superiority or inferiority of the test parameter set and that of the optimal parameter set is finally determined.

When the test parameter set is determined to be superior (in other words, the line graph 510 has deviated from the evaluation continuing range in the direction of performance improvement) in Step 425, the processing proceeds from Step 425 to Step 430. Then, the workload of the full set (for 30 minutes) is given to the web system 120 formed of the test parameter set. Next, the processing proceeds to Step 435, and the test parameter set and the measurement result thereof are stored as those of the optimal parameter set. The processing proceeds to Step 440.

When the optimal parameter set is determined to be superior (in other words, the line graph 510 has deviated from the evaluation continuing range in the direction of performance deterioration) in Step 425, the processing proceeds from Step 425 directly to Step 440. Then, the performance evaluation for the test parameter set is terminated. This processing makes any further measurement for the test parameter set unnecessary, and contributes to the shortening of the evaluation time.

In Step 440, it is determined whether or not there remain sets for which performance has not been evaluated. When it is determined that the parameter sets for which performance has not been evaluated remain in Step 440, the processing returns from Step 440 to Step 410 via an arrow indicated by YES. A new test parameter set is selected from the remaining parameter sets, and the above-mentioned steps are repeated.

When it is determined that no unevaluated parameter sets remain in Step 440, the processing proceeds from Step 440 to Step 445. The processing is terminated after the current optimal parameter set is presented, as a final parameter set, to the user via the output unit 230.

Figure 6:
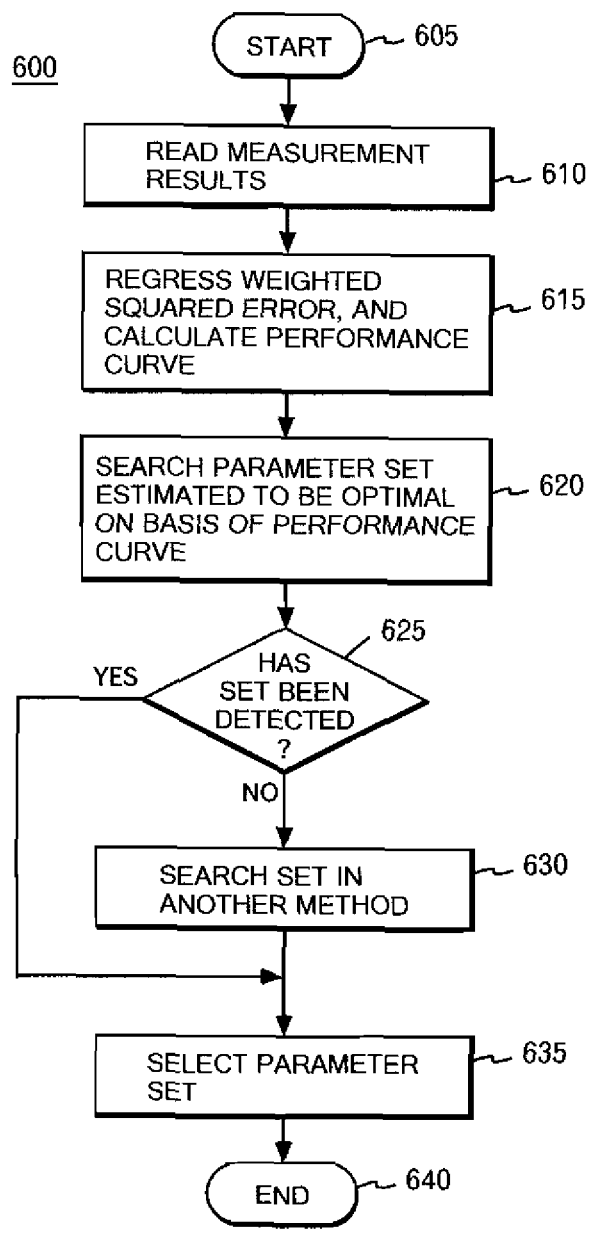
FIG. 6 is a flowchart expressing a flow for selecting a parameter set which is estimated to be optimal in the embodiment of the present invention.

FIG. 6 is a flowchart 600 expressing a flow of selecting a parameter set which is estimated to be optimal in the embodiment of the present invention. With the flowchart 600, descriptions will be more clearly given of the processing in Step 410 of the flowchart 400 shown in FIG. 4. The processing starts in Step 605, and the measurement results of the parameter sets for which performance has already been measured are read in Step 610.

The processing proceeds to Step 615. Started is information processing for selecting a parameter set, under which performance is estimated to be the best, out of parameter sets for which performance has not been measured, on the basis of the plurality of measurement results read in Step 610. For such information processing, it is possible to use a method for estimating the performance of a targeted parameter set for which performance has not been measured, on the basis of the past results of the performance measurement. More specifically, a performance curve is obtained by selecting a regression function so as to minimize a squared error, and thereby it is possible to select a parameter set under which performance is estimated to be the best, by use of the performance curve.

Figure 7:
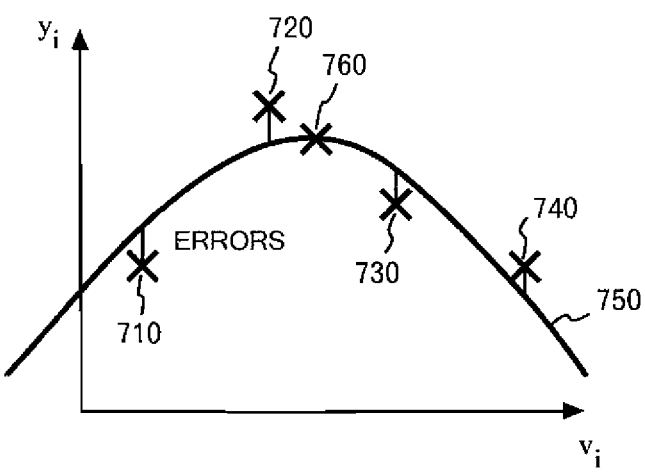
FIGS. 7A and 7B are views for explaining a method for selecting the parameter set which is estimated to be optimal in the embodiment of the present invention.
Figure 7:
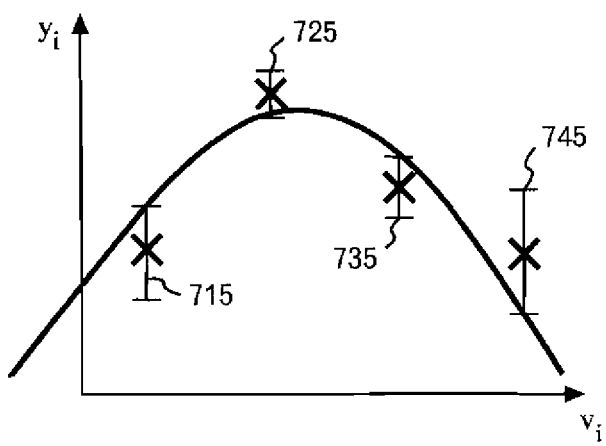

With reference to FIG. 7A, descriptions will be given of an example of a case where a performance curve is approximated to a quadratic curve. In this case, it is possible to calculate a performance curve (750) by selecting a regression function in a manner that a value obtained with (formula 1) is at the minimum by use of the past measurement results (710, 720, 730, and 740). Thereby, it is made possible to identify a parameter set (760) which is estimated to be the best on the basis of the calculated performance curve (refer to a graph of FIG. 7A). Incidentally, the number of variable parameter types is set to be one in order to simplify the descriptions. Meanwhile, it is needless to say that a multidimensional performance curve can be calculated by having a plurality of variable parameters.

$$\sum_i (av_i^2 + bv_i + c - y_i)^2 \qquad \text{(formula 1)}$$

$v_i$: a variable parameter included in a parameter set i
$y_i$: a measurement value of a throughput of a system formed of the parameter set i Incidentally, the performance measurement is not always made with a full set (30 minutes) as has already described in the embodiment of the present invention. Accordingly, the measurement accuracy (715, 725, 735, and 745 in FIG. 7B) may vary among the plurality of measurement results (710, 720, 730, and 740) read in Step 610. For example, suppose that a certain parameter set is determined to be inferior in performance to an existing optimal parameter set at the time when the performance thereof is evaluated by receiving workloads for 10 minutes only. In this case, the evaluation for the test parameter set is terminated at this time (refer to Step 425 in FIG. 4). With regard to a parameter set for which this performance evaluation is carried out, it is needless to say that a performance value stored in the optimization apparatus 100 has accuracy lower than a performance value of performance evaluation carried out with a full set (30 minutes).

In the embodiment of the present invention, a performance curve with relatively low accuracy may possibly be calculated due to this difference in accuracy as compared with a case of evaluating, with a full set, the performance for all of the configuration parameter sets. For this reason, in the embodiment of the present invention, it is preferable that a performance curve be calculated by providing high evaluation for the performance curve with high accuracy, and by providing low evaluation for one with low accuracy. Specifically, in the embodiment of the present invention, it is preferable that a performance curve be obtained by regressing a squared error so as to minimize the squared error which uses, as a weight in relation to accuracy, (1) the number Ni of batches of performance evaluation performed for each parameter set, and (2) sample variance Si indicating variations in the performance evaluation value for each parameter set.

Accordingly, when a performance curve approximated to a quadratic curve is calculated by use of a weighted squared error, the performance curve can be calculated by selecting a regression function that a value obtained with (formula 2) is at the minimum.

$$\sum_i \frac{N_i}{S_i^2}(av_i^2 + bv_i + c - y_i)^2 \qquad \text{(formula 2)}$$

$V_i$: a variable parameter included in the parameter set i
$y_i$: a measurement value of a throughput of a system formed of the parameter set i
$N_i$: the number of batches of performance evaluation performed for the parameter set i
$S_i^2$: sample variance for the parameter set i Note that the sample variance Si for the parameter set i can be obtained by calculation with (formula 3) in the optimization apparatus 100.

$$S_i^2 = \frac{1}{N_i - 1} \sum_{t=i}^{N_i} (X_{i,t} - Y_i) \qquad \text{(formula 3)}$$

$S_i^2$: sample variance for the parameter set i
$N_i$: the number of batches of performance evaluation performed for the parameter set i
$X_i$: a measurement value of a throughput of a first batch for the performance evaluation for the parameter set i
$Y_i$: a mean of the measurement values of throughputs of the entire performance evaluation for the parameter set i The processing proceeds to Step 620, and a parameter set, under which performance is estimated to be the best, is searched for from parameter sets for which performance has not been measured, by use of the calculated performance curve. The processing proceeds to Step 625, and it is determined whether or not the parameter set is found by the search in Step 620. When the parameter set is determined to be found in Step 625, the processing proceeds to Step 635 from Step 525 via an arrow indicated by YES. The performance under the parameter set is then estimated to be the best performance, and is selected. The processing proceeds to Step 640, and the selection of the parameter set is terminated. Afterwards, the processing from Step 415 onward in FIG. 4 is performed.

When it is determined that the parameter set is not found in Step 625, the processing proceeds to Step 530. A parameter set, under which performance is estimated to be the best, is searched for by use of a different known method (for example, a search algorithm). Then, the processing proceeds to Step 625. The parameter set which has been searched for by the different method, is estimated to cause a system to perform most excellently, and is selected. The processing proceeds to Step 640, and the selection of the parameter set is terminated. Afterwards, the processing from Step 415 onward in FIG. 4 is performed.

Figure 8:
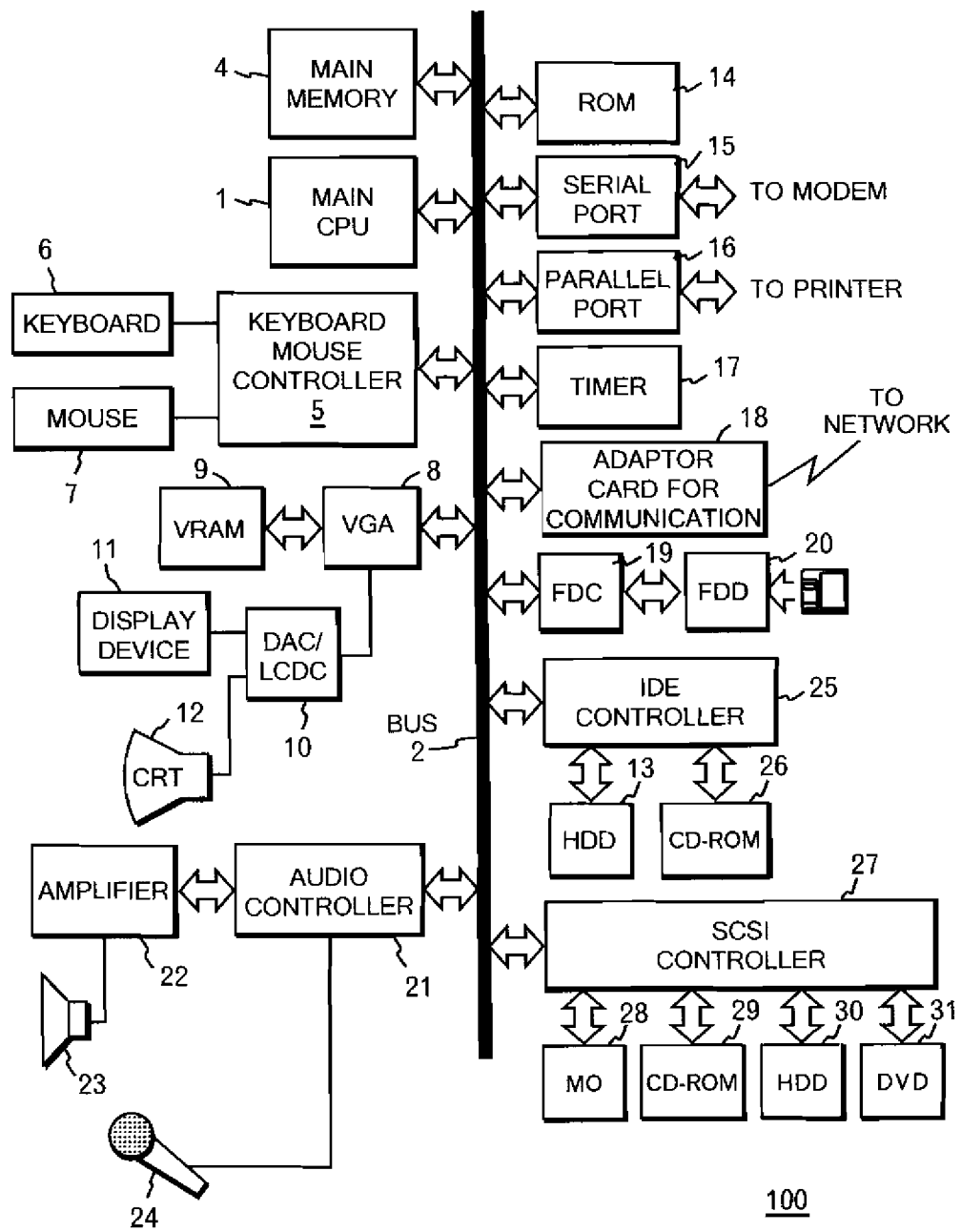
FIG. 8 is a view showing an example of a hardware configuration of an information processor suitable for substantiating the optimization apparatus in the embodiment of the present invention.

FIG. 8 is a view showing an example of a hardware configuration of an information professor which is suitable for substantiating the optimization apparatus 100 of the embodiment of the present invention. The information processor includes a central processing unit (CPU) 1 and the main memory 4, both of which are connected to a bus 2. Removable storages (external storage systems which can replace a recording medium with another), such as hard disk devices 13 and 30, CD-ROM devices 26 and 29, a flexible disk device 20, an MO device 28, and a DVD device 31, are connected to the bus 2 via a Floppy® disk controller 19, an IDE controller 25, and a SCSI controller 27.

A recording medium such as a flexible disk, an MO, a CD-ROM, or a DVD-ROM is inserted to the removable storage. It is possible to store a code of a computer program for executing the present invention, in this recording medium, the hard disk devices 13 and 30, and a ROM 14, by giving a command to the CPU and the like in cooperation with an operating system. The computer program is executed by being loaded to the main memory 4. The computer program can be compressed, or be divided into a plurality of programs to be respectively stored in a plurality of media.

The information processor receives an input from the input device such as the keyboard 6 or the mouse 7 via a keyboard/mouse controller 5. The information processor is connected, via a DAC/LCDC 10, to the display device 11 for presenting visual data to the user.

The information processor can be connected to a network via a network adaptor 18 (an Ethernet® card or a token-ring card) and the like, and can thus communicate with other computers and the like. Although it is not illustrated, the information processor can also be connected to a printer via a parallel port, or to a modem via a serial port.

From the above descriptions, it is easily understood that an information processor, which is suitable for substantiating the data processing system 100 in the embodiment of the present invention, is an information processor such as a common personal computer, a workstation, or a mainframe. Alternatively, the information processor can be substantiated by a combination of these information processors. However, these configuration elements are examples, and all of the configuration elements are not necessarily required as configuration elements essential to the present invention.

It is needless to say that those skilled in that art can easily consider that various alterations can be made to each hardware configuration element of the information processor in the embodiment of the present invention. For example, one of such alteration can be made by combining a plurality of machines, and by distributing functions to the machines. These alterations are a concept obviously included in a principle of the present invention.

The optimization apparatus 100 can employ an operating system which supports a graphical user interface (GUI) multi-window environment such as the Windows® operating system offered by Microsoft Corporation, the MacOS® offered by Apple Computer Inc., or the UNIX® type system provided with the X Window System (for example, AIX® offered by International Business Machines Corporation or Linux®).

It is to be understood from the above descriptions that a data processing system used in the embodiment of the present invention is not limited to a specific multi-window operating system. In other words, any operating system can be adopted as long as an operating system can provide a resource management function which can cause application software and the like to use a resource of a data processing system. Incidentally, the resource management function can include functions of hardware resource management, file handling, spooling, job management, memory protection, virtual storage management, and the like. Detailed descriptions thereof, however, will be omitted since these functions are well known to those skilled in the art.

In addition, the present invention can be substantiated as hardware, software, or a combination of hardware and software. As for execution by the combination of hardware and software, execution in a data processing system having a predetermined program can be cited as a typical example. In this case, the predetermined program controls the data processing system and causes the processing according to the present invention to be executed, by being loaded to, and then executed in the data processing system. This program is configured of a command group which can be expressed in an arbitrary language, code and notation. This type of command group makes it possible to cause the system to execute any one of specific functions directly, or after anyone of, or both of: 1. conversion to another language, code and notation; and 2. duplication of the command group to another medium.

It is needless to say that the scope of the present invention includes not only the above type of program itself, but also a medium where the program is stored. A program for executing the functions of the present invention can be stored in an arbitrary computer-readable recording medium such as a flexible disk, an MO, a CD-ROM, a DVD, a hard disk device, a ROM, a MRAM or a RAM. In order to be stored in a recording medium, this program can be downloaded from another data processing system connected via a communication line, or can be duplicated from another recording medium so that the program can be stored in a recording medium. Furthermore, the program can be compressed to be stored in a single recording medium, or be divided into a plurality of programs to be respectively stored in a plurality of recording media. Moreover, it should be noted that it is needless to say that it is possible to provide a program product which executes the present invention in various modes.

As mentioned above, according to the embodiment of the present invention, it is possible to efficiently optimize a parameter set for a web system including a plurality of configuration parameters. Accordingly, it is easily understood that a web system with high performance can be constructed efficiently.

It is obvious for those skilled in the art that various alterations or improvements can be added to the above embodiment. For example, the performance evaluation is performed for all of the prepared parameter sets in the embodiment of the present invention. Meanwhile, the evaluation for a parameter set may be terminated when predetermined conditions are satisfied, for example, (1) when a predetermined time has passed after the initiation of the performance evaluation of the system is satisfied; and (2) when performance evaluation has been performed for the predetermined number of parameter sets. It should be noted that an embodiment to which such an alteration or improvement is added is obviously included in the technical scope of the present invention.

What is claimed is:

1. A computer-implemented method for optimizing a parameter set composed of a plurality of system configuration parameters, comprising steps of:

storing a plurality of parameter sets;

selecting one of the plurality of parameter sets as a test parameter set to be evaluated;

measuring performance only for one batch job out of N batch jobs constituting full set performance measurement for the test parameter set, where N is a positive integer;

calculating an evaluation value based on a difference between an integral of measurement values obtained until the performance has been measured for r batch jobs constituting full set performance measurement, by using the test parameter set; and an integral of mean measurement values obtained by performing the performance measurement for the r batch jobs by using an optimal parameter set which is one of the parameter sets used in the performance measurement having been performed, where r is a positive integer less than N;

determining whether or not the evaluation value has deviated from an evaluation continuing range of a width from a width W where r is equal to zero, to a width W' where r is equal to N; and terminating the evaluation for the test parameter set on condition that the evaluation value is determined, in the determining step, to have deviated from the evaluation continuing range in a direction of performance deterioration, wherein at least one of the steps is carried out by a computer device.

2. The method according to claim 1, wherein the value of W' is less than the value of W.

3. The method according to claim 1, wherein the value of W' is zero.

4. The method according to claim 1, further comprising repeating the steps of: performing performance measurement; calculating the evaluation value; and determining, until the evaluation value is determined, in the determining step, to have deviated from the evaluation continuing range in a direction of performance deterioration or performance improvement.

5. The method according to claim 1, further comprising a step of replacing a current optimal parameter set with the test parameter set when it is determined that the evaluation value has deviated from the evaluation continuing range toward the direction of performance improvement.

6. The method according to claim 5, further comprising a step of performing full set performance measurement for the test parameter set when it is determined that the evaluation value has deviated from the evaluation continuing range toward the direction of performance improvement.

7. The method according to claim 1, wherein the width of the evaluation continuing range becomes narrow as a value of r increases.

8. The method according to claim 1, wherein the width of the evaluation continuing range becomes narrow linearly as a value of r increases.

9. The method according to claim 1, further comprising steps of:

selecting an initial optimal parameter set from the plurality of parameter sets; and performing full set performance measurement for the initial optimal parameter set.

10. The method according to claim 1, wherein the selecting step includes a step of selecting, as the test parameter set, a parameter set having best estimated performance from the plurality of parameter sets.

11. The method according to claim 1, wherein the selecting step includes a step of selecting, as the test parameter set, a parameter set, having best estimated performance from parameter sets for which the performance has not been evaluated among the plurality of parameter sets, on the basis of evaluation results of the parameter sets for which the performance has already been evaluated.

12. The method according to claim 1, wherein the selecting step includes steps of:

calculating a performance curve by regressing a squared error so as to minimize the squared error to which a weight is assigned in relation to the accuracy of the evaluation results, by use of the evaluation results of the parameter sets under which the performance has already been evaluated; and searching for a parameter set under which the performance is estimated to be the best by use of the performance curve.

13. The method according to claim 12, wherein a weight is assigned to the squared error based on a number of batches for which the performance evaluation has been performed for each parameter set.

14. The method according to claim 12, wherein a weight is assigned to the squared error based on an index which shows a variation in the performance evaluation values of the respective parameter sets.

15. The method according to claim 12, further comprising approximating the performance curve to a quadratic curve.

16. The method according to claim 12, wherein the selecting step further includes steps of:

determining whether or not a parameter set, under which the performance is estimated to be the best, is detected in the searching step; and selecting the detected parameter set as the test parameter set in response to the determination that the parameter set is detected in the step of determining whether or not the parameter set, under which the performance is estimated to be the best, is detected.

17. The method according to claim 16, wherein the selecting step further includes a step of executing another method for searching for a parameter set estimated to be optimal in response to the determination that the parameter set is not detected in the step of determining whether or not the parameter set, under which the performance is estimated to be the best, is detected.

18. The method according to claim 1, further comprising repeating the steps of: selecting; performing the performance measurement; calculating the evaluation value; determining whether or not the evaluation value has deviated from the evaluation continuing range; and terminating the evaluation, until the performance measurement for all of the plurality of parameter sets is completed.

19. The method according to claim 1, further comprising repeating the steps of: selecting; performing the performance measurement; calculating the evaluation value; determining whether or not the evaluation value has deviated from the evaluation continuing range; and terminating the evaluation, until a predetermined condition is satisfied.

20. The method according to claim 19, wherein the predetermined condition is that a predetermined period of time has passed after the initiation of the performance evaluation of a system.

21. The method according to claim 19, wherein the predetermined condition is an upper limit of the number of parameter sets for which the performance measurement is performed.

22. The method according to claim 1, wherein the system is a web system.

23. A computer-implemented method for a computer processing device for selecting a configuration parameter set, under which the performance is estimated to be the best, from a plurality of configuration parameter sets for which the performance has not been measured, based on results of performance measurement of a plurality of configuration parameter sets for which the performance has already been measured, comprising steps of:

calling measurement results of the plurality of parameter sets for which the performance has already been measured, the measurement results possibly varying from one another in terms of measurement accuracy;

calculating a performance curve by regressing a squared error to minimize the squared error to which a weight is assigned in relation to the accuracy of the evaluation results, by use of the evaluation results of the parameter sets for which the performance has already been evaluated; and using the performance curve to search for a parameter set having a best estimated performance.

24. The method according to claim 23, wherein a weight is assigned to the squared error based on a number of batches for which the performance evaluation has been performed for each parameter set.

25. The method according to claim 23, wherein a weight is assigned to the squared error based on an index which shows a variation in the performance evaluation values of the respective parameter sets.

26. The method according to claim 23, further comprising approximating the performance curve to a quadratic curve.

27. A tangible computer program storage medium storing a program of instructions executable by a computer processing device for optimizing a parameter set composed of a plurality of system configuration parameters, the program causing a computer to execute the steps of:

storing a plurality of parameter sets;

selecting one of the plurality of parameter sets as a test parameter set to be evaluated;

measuring performance only for one batch job out of N batch jobs constituting full set performance measurement for the test parameter set, where N is a positive integer;

calculating an evaluation value based on a difference between an integral of measurement values obtained until the performance has been measured for r batch jobs by using the test parameter set, and an integral of mean measurement values of the performance for the r batch jobs by using an optimal parameter set being one of the parameter sets for which the performance measurement has been performed, where r is a positive integer less than N;

determining whether or not the evaluation value has deviated from an evaluation continuing range of a width from a width W where r is equal to zero, to a width W' where r is equal to N; and terminating the evaluation for the test parameter set on condition that the evaluation value is determined, in the determining step, to have deviated from the evaluation continuing range in a direction of performance deterioration.

28. An apparatus for optimizing a parameter set composed of a plurality of system configuration parameters, comprising at least one processing device:

a parameter set storage unit which stores a plurality of parameter sets;

an input device for receiving selection input of one of the plurality of parameter sets as a test parameter set to be evaluated;

a data analyzer to measure performance only for one batch job out of N batch jobs constituting full set performance measurement for the test parameter set, where N is a positive integer; and a measurement controller to calculate an evaluation value based on a difference between an integral of measurement values obtained until the performance has been measured for r batch jobs constituting full set performance measurement, and an integral of a mean measurement values of the performance for the r batch jobs by using an optimal parameter set which is one of the parameter sets used in the performance measurement having been performed, where r is a positive integer less than N; to determine whether or not the evaluation value has deviated from an evaluation continuing range of a width from a width W where r is equal to zero, to a width W' where r is equal to N; and to terminate the evaluation on the test parameter set on condition that the evaluation value is determined to have deviated from the evaluation continuing range in a direction of performance deterioration.

* * * * *